United States Patent [19]
Takata et al.

[11] Patent Number: 5,307,274
[45] Date of Patent: Apr. 26, 1994

[54] ZERO-POINT CORRECTION DEVICE FOR A GRAVITY-TYPE ACCELEROMETER

[75] Inventors: Koji Takata; Tohru Nakaura, both of Itami, Japan

[73] Assignee: Sumitomo Electric Industries, Ltd., Osaka, Japan

[21] Appl. No.: 811,942

[22] Filed: Dec. 23, 1991

[30] Foreign Application Priority Data

Dec. 26, 1990 [JP] Japan .................................. 2-406743

[51] Int. Cl.$^5$ ............................................. G01L 25/00
[52] U.S. Cl. ........................... 364/426.01; 364/426.02; 364/566; 364/571.02; 73/1 D
[58] Field of Search ........................ 364/426.01, 426.02, 364/566, 571.01, 571.02, 571.04, 571.07; 73/1 R, 1 D, 488, 507, 511, 512, 535

[56] References Cited

U.S. PATENT DOCUMENTS

| | | | |
|---|---|---|---|
| 4,188,816 | 2/1990 | Mairson | 73/1 D |
| 4,336,718 | 6/1982 | Washburn | 364/566 |
| 4,470,124 | 9/1984 | Tagami et al. | 73/1 D |
| 5,048,319 | 9/1991 | Neuhaus | 73/1 D |
| 5,065,612 | 11/1991 | Ooka et al. | 73/1 D |
| 5,146,417 | 9/1992 | Watson | 364/566 |

FOREIGN PATENT DOCUMENTS

| | | |
|---|---|---|
| 0205277 | 12/1986 | European Pat. Off. . |
| 0322911 | 7/1989 | European Pat. Off. . |
| 0331131 | 9/1989 | European Pat. Off. . |
| 3342553 | 6/1985 | Fed. Rep. of Germany . |
| 9104892 | 4/1991 | World Int. Prop. O. . |

*Primary Examiner*—Gary Chin
*Attorney, Agent, or Firm*—Sandler Greenblum & Bernstein

[57] ABSTRACT

A zero-point correction device for a gravity-type accelerometer employed in a vehicle having wheels, includes a calculator for calculating an estimated vehicle acceleration Aw based on the wheel speed, and a detector for detecting a gravitationally detected acceleration Am based on said gravity-type accelerometer. A subtractor is provided for subtracting a correction amount Ao obtained in each operation cycle from the gravitationally detected acceleration Am to produce a corrected acceleration Ac which is a corrected version of said gravitationally detected acceleration Am. The correction amount Ao for the present operation cycle is obtained by adding to the correction amount Ao obtained in the previous cycle, a value commensurate with a difference between the estimated vehicle acceleration Aw and the corrected acceleration Ac.

21 Claims, 8 Drawing Sheets

ZERO-POINT CORRECTION DEVICE FOR A GRAVITY-TYPE ACCELEROMETER

BACKGROUND OF THE INVENTION

1. Field of the Invention

The present invention relates to a gravity-type accelerometer used to calculate the estimated vehicle speed of a motor vehicle, and more particularly to a zero-point correction device there for.

2. Description of the Prior Art

In antilock brake control devices and other wheel behavior control devices, estimating wheel slipping or spinning based on the calculated vehicle speed, and estimating the coefficient of friction between the tire and the road surface are important factors directly affecting the control performance of the device. The coefficient of friction between the tire and road is normally estimated based on the estimated value of vehicle acceleration during control, and the vehicle acceleration is estimated based on the estimated vehicle speed. Therefore, the performance of the wheel behavior control device is greatly dependent upon the precision of vehicle speed estimation.

However, if the vehicle speed is estimated from the wheel speed alone, the estimating precision is reduced significantly when the tires slip or spin badly. Therefore, if the vehicle speed and vehicle acceleration are estimated based on both the wheel speed and the acceleration obtained from a reliable accelerometer, the estimating precision can be significantly increased. A typical type of accelerometer is the gravity-type accelerometer.

Figure 5:
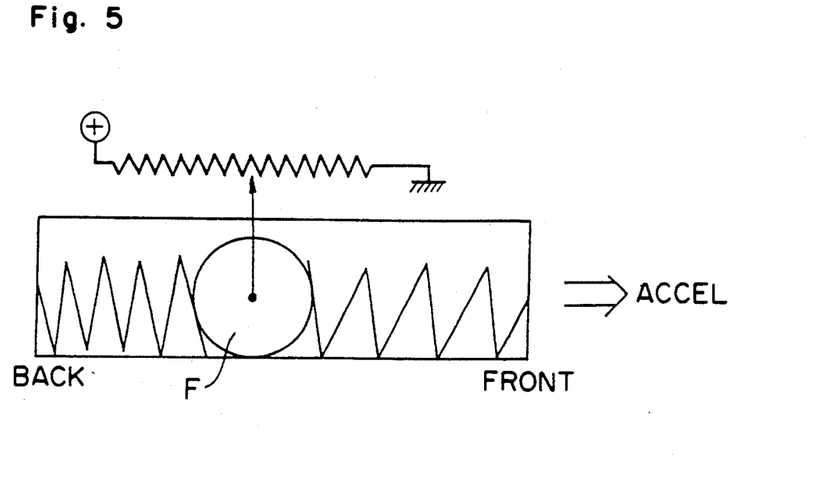
FIG. 5 is a fragmentary view of a gravity-type accelerometer.

As illustrated in FIG. 5, the gravity-type accelerometer detects acceleration by converting the displacement of an weight F caused by acceleration to an electrical signal using resistors, piezoelectric elements, differential transformers, and other devices. But besides the undesirable effects caused by the relatively long-term variations, such as installation precision, electrical drift and gain change, the effect of the slope of the road being drive on is also unavoidable.

Therefore, when using a gravity-type accelerometer, it is extremely important how to correct these undesirable effects including the effect of the slope of the road.

SUMMARY OF THE INVENTION

Therefore, an object of the present invention is to provide a zero-point correction device for a gravity-type accelerometer comprising means for detecting a rotational velocity of the wheel speed of at least one wheel of said vehicle at each operation cycle; means for calculating an estimated vehicle acceleration Aw estimated from said wheel speed; means for measuring a gravitationally detected acceleration am based on said gravity-type accelerometer; means for producing an adjustment speed k which is between 0 and 1 based on said estimated vehicle acceleration Aw and said gravitationally detected acceleration Am; means for subtracting a correction amount Ao obtained in each operation cycle from said gravitationally detected acceleration Am to produce a corrected acceleration Ac which is a corrected version of said gravitationally detected acceleration Am; and means for calculating said correction amount Ao for the present operation cycle by adding to the correction amount Ao obtained in the previous cycle, a product of said adjustment speed k multiplied by a difference between the estimated vehicle acceleration Aw and the corrected acceleration Ac.

The difference between the estimated vehicle acceleration Aw estimated from the wheel speed and the acceleration Ac obtained from the calibrated gravity-type accelerometer is obtained, and the product of this difference multiplied by the adjustment speed k is added to or subtracted from the correction amount obtained in the previous cycle to output the correction amount Ao for the current cycle, which is used to correct the acceleration Am obtained from the gravity-type accelerometer in the current cycle or in the next cycle.

BRIEF DESCRIPTION OF THE DRAWINGS

The present invention will become more fully understood from the detailed description given below and the accompanying diagrams wherein.

DESCRIPTION OF THE PREFERRED EMBODIMENTS

Before proceeding to a detailed description of the preferred embodiments of a zero-point correction device for a gravity-type accelerometer according to the present invention, the principle for zero-point correction in a gravity-type accelerometer is first described.

Figure 6:
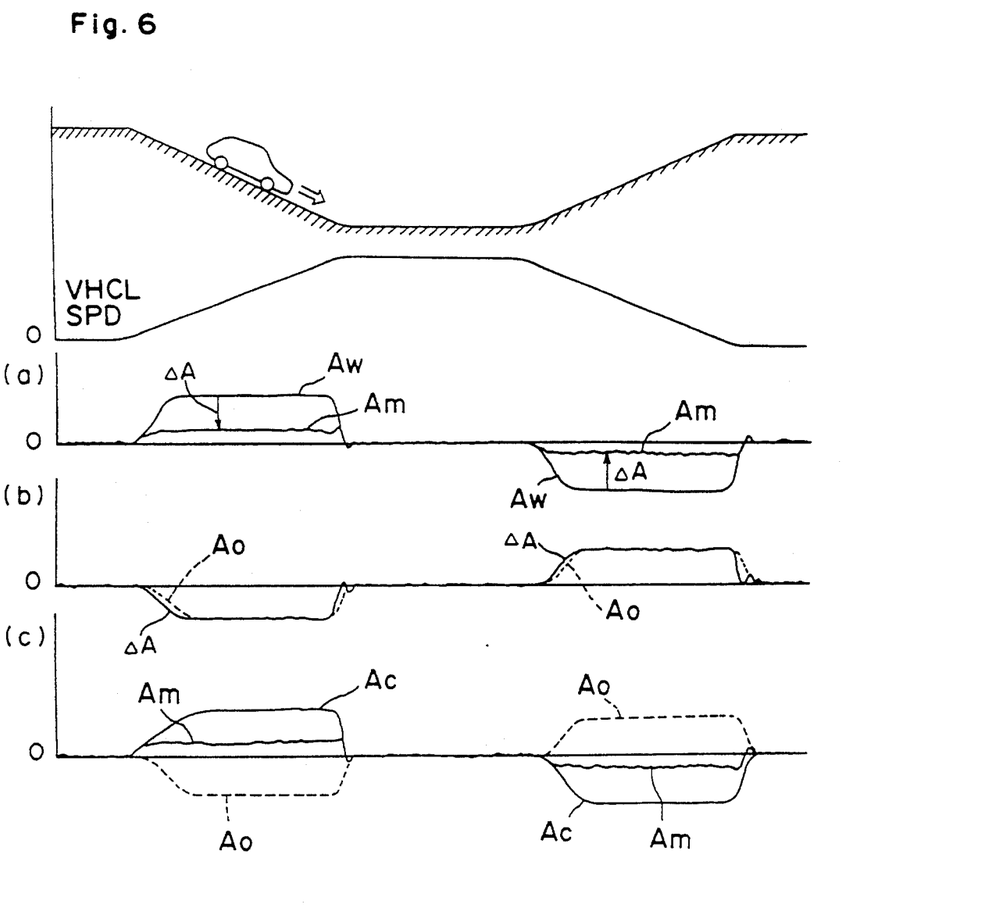
FIGS. 6(a), 6(b) and 6(c) are graphs illustrating the effects of hills on a gravity-type accelerometer.

FIG. 6 illustrates the speed of a vehicle equipped with a gravity-type accelerometer which accelerates with the aid of the engine as it goes downhill, and then decelerates with the application of the brakes as it goes uphill.

If the vehicle is stopped facing downhill, the weight a of the gravity-type gravity-type will be displaced forward due to the pull of gravity. Furthermore, when the vehicle accelerates downhill with the aid of the engine, the weight F is displaced forward by the pull of gravity while the acceleration of the vehicle is causing the weight F to be pushed to the back. These opposing forces cause the output of the gravity-type accelerometer to be a value less than the actual vehicle acceleration. It is therefore necessary to negative direction by an amount equal to the displacement of the weight F by the pull of gravity.

In the following description the vehicle acceleration estimated from the wheel speed shall be expressed as Aw, the output of the gravity-type accelerometer as Am, the zero point correction amount of the gravity-type accelerometer a Ao, and the acceleration output by the gravity-type accelerometer after correction as Ac. It is to be noted that the unit of Aw, Am, Ao, and Ac is the product of the acceleration of gravity and the operation cycle time.

As described above, when the vehicle accelerates downhill, the output Am of the gravity-type accelerometer is a value smaller than the estimated vehicle acceleration Aw, which is based on the wheel speed (it is here assumed that Aw indicates the true vehicle acceleration).

Thus, the difference $\Delta A$ (where $\Delta A = Am - Aw$) corresponds to the displacement of the zero point of the weight F. If the correction amount Ao is equal to $\Delta A$, then the corrected value $Ac = Am - Ao$ will correspond to the value Aw. Thus, when Aw expresses the true vehicle acceleration, it is sufficient to set the value Ao as close as possible to the difference $\Delta A = Am - Aw$. Thus, if the value which traces $\Delta A$ by applying a filter operation is used as the zero-point correction amount Ao, i.e., if $$Ao \rightarrow Am - Aw \qquad (1)$$

then by subtracting the zero-point correction amount Ao from the output Am of the gravity-type accelerometer, a precise vehicle acceleration Ac is obtained as shown in FIG. 6(c). The correction equation for the gravity-type accelerometer output can therefore be expressed as:

$$Ac = Am - Ao \qquad (2)$$

The same is true when the vehicle decelerates while travelling uphill.

Therefore in the present invention it is assumed that the vehicle acceleration estimated from the wheel speed is reliable when there is not excessive tire slipping or spinning and this value is used as the estimated vehicle acceleration and the correction amount of the zero point is adjusted based on this value. However, when excessive tire slipping or spinning does occur, the vehicle acceleration estimated from the wheel speed is assumed to be unreliable, and the acceleration obtained from the gravity-type accelerometer using the correction amount at that point is used as the estimated vehicle acceleration and adjustment of the zero point correction amount is suppressed.

Thus, when excessive tire slipping or spinning is not present, it is sufficient to change the value Ac so that it approaches Aw, i.e., as shown in Equation (1) to change the value Ao so that it approaches the difference Am−Aw.

Thus, if k is the adjustment speed or adjustment rate of the correction amount, where ($0 \leq k \leq 1$), then $$\begin{aligned} Ao &= Ao + (Am - Aw - Ao)*k \\ &= Ao + (Ac - Aw)*k \end{aligned} \qquad (3)$$

such that the value k is increased (to near 1) when excessive tire slipping or spinning are not apparent, and k is decreased (to near 0) when excessive tire slipping or spinning appears present. Because the value k defines the amount of adjustment in one operation cycle, it should be modified accordingly when the unit operation cycle time is modified.

Looking from a different viewpoint, the above can be said that the correction is added. In this case, the same effect can be expressed as $$Ac = Am + Ao$$

$$Ao - Ao = (Aw - Ac)*k.$$

Referring to Equation (3), the zero-point correction amount Ao applied to the gravity-type accelerometer in the current cycle is expressed as the sum of the correction amount Ao for the previous cycle added to the product of the adjustment speed k (where $0 \leq k \leq 1$) of the correction amount multiplied by the difference between the acceleration Ac obtained from the gravity-type accelerometer after correction and the estimated vehicle acceleration Aw based on the wheel speed. Therefore, the difference dAo between the correction amount Ao in the previous and current cycles can be expressed as the adjustment amount by the equation (4):

$$dAo = (Ac - Aw)*k \qquad (4)$$

The principle whereby the adjustment speed k the correction amount, which is essential to achieving the object of the invention, is set as described next.

To set k, it is necessary to distinguish between when there is true excessive tire slipping or spinning, and when there is only apparent excessive tire slipping or spinning due to the combination of the road slope and the vehicle acceleration or deceleration. The latter case can occur with nearly any combination of values, and excessive tire slipping or spinning is therefore assumed to be due to the latter case except when the features of the former case, as described below, are pronounced.

When excessive tire slipping or spinning begins, there is little change in the output acceleration Am of the gravity-type accelerometer, but there is a rapid change in the estimated vehicle acceleration Aw based on the wheel speed with the estimated vehicle acceleration Aw reaching a high absolute value. This is considered as Feature 1.

However, when excessive tire slipping or spinning continues, there is little change in Am or in Aw, and this state is therefore difficult to identify. In this case, if the integrations of Am and Aw are obtained based on the values before excessive tire slipping or spinning began, a state in which the difference there between remains high in comparison to the elapsed time continues. This is considered as Feature 2. Integration of acceleration and deceleration is equivalent to obtaining the estimated speed. However, when Feature 2 is used, sufficient caution is required because a mistaken determination has the danger of compounding the error thereafter.

Figure 7A:
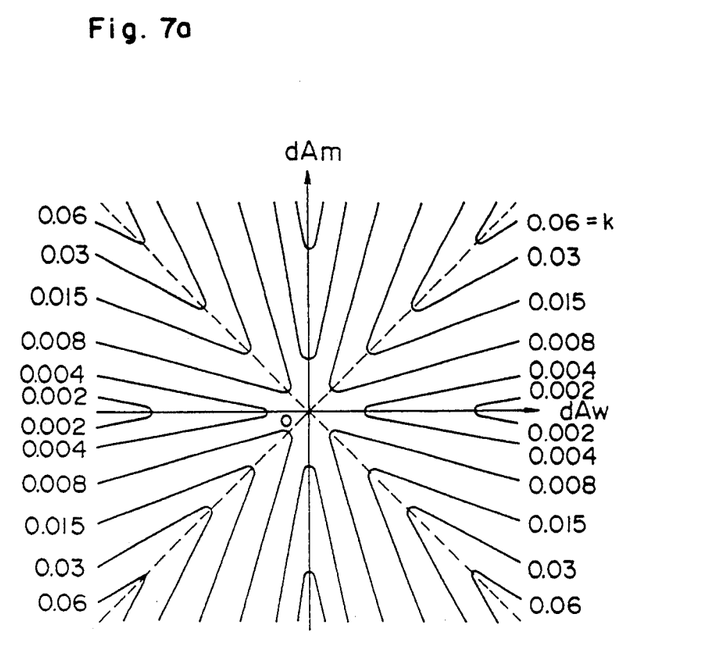
FIGS. 7(a) and 7(b) are graphs of a map of the adjustment speed k values for zero-point correction.
Figure 7B:
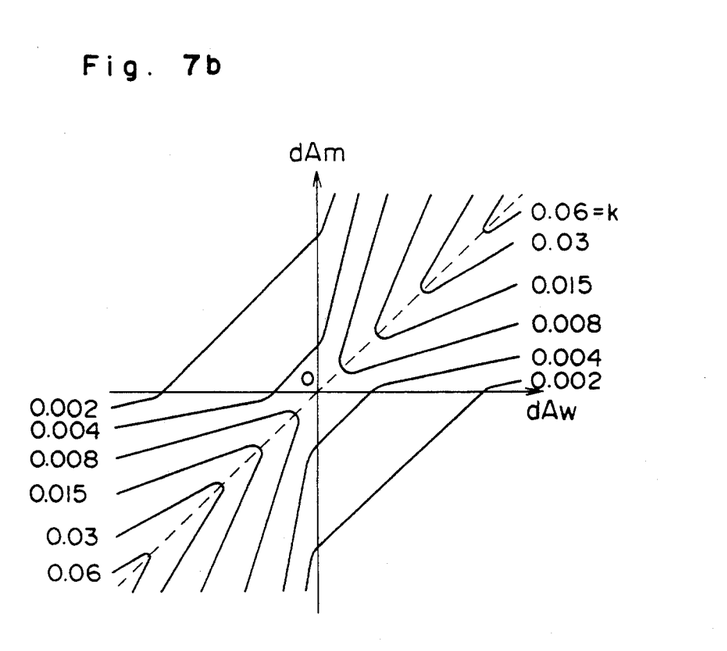

Using Feature 1, k can be defined as the contour lines on a map of which the vertical and horizontal axes are the differentials of Am Adam) and Aw (dAw), respectively. An example of this map is shown in FIGS. 7(a). The lines at approximately 45° on the map indicate that the behavior of Am and Aw is roughly the same with no excessive tire slipping or spinning. Thus, the adjustment speed k of the correction amount is therefore set high. Another example of the map is shown in FIG. 7(b).

However, the behavior near the origin on the same 45° lines is rather uncertain while this feature becomes more pronounced farther away from the origin. The adjustment speed k of the correction amount is therefore set to a median value near the origin, and increased farther away from the origin.

In the area along the horizontal axis the change in Am is small (i.e., the change is slow). Thus, when the |Aw| is high (the change in Aw is great, i.e., fast) in this area, it is determined that excessive tire slipping or spinning is starting or has already started, and the adjustment speed k of the correction amount is therefore set low.

The area along the vertical axis and where |dAm| is high corresponds to a case where the vehicle is pitching immediately after stopping and immediately after starting. Thus, for such an area, the adjustment speed k of the correction amount is set low.

The above evaluation may also be based on the fact that the absolute value of the estimated vehicle speed Vw is low or zero rather than the fact that |dAw|0 is low.

The adjustment speed k of the correction amount can therefore be set for all conditions using a map as shown in FIG. 7. It is to be noted that the values of k shown in FIGS. 7, 8, 9, and 10 are for purposes of description only.

The adjustment speed k of the correction amount can also be calculated by applying a suitable equation, and can also be obtained from an appropriate numeric table. In the case of a numeric table, the contour lines are formed by a combination of polygonal or fold lines, a portion of the fold line being parallel to the horizontal axis and another portion being parallel to the vertical axis.

If k is obtained directly by applying an equation, the contour lines can be defined as any desired curves. In the preferred embodiments described below, the adjustment speed k of the correction amount is expressed as a general function $k = f(x,y)$.

Figure 8:
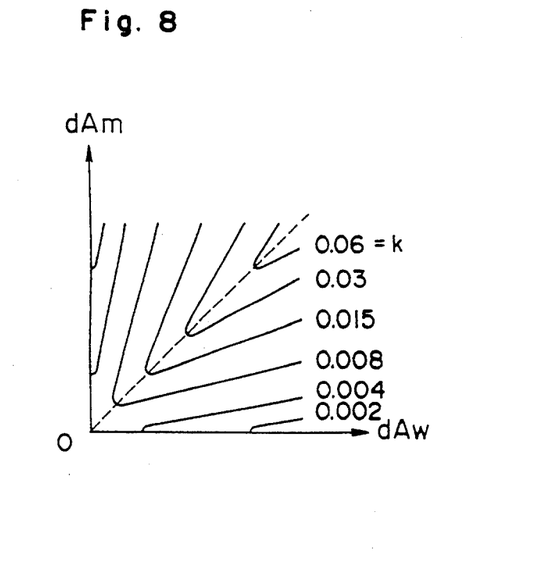
FIG. 8 is a graph of a simplified version of the map in FIG. 7(a)

The map can be made smaller by taking the absolute expression of the value when the contour lines of the map can be drawn symmetrically without significant deterioration in practical application. For example, the size of the map in FIG. 8 is ¼ that shown in FIG. 7, provided that the equation, $$k = f(|x|, |y|)$$

has a sufficient approximating precision.

Figure 9:
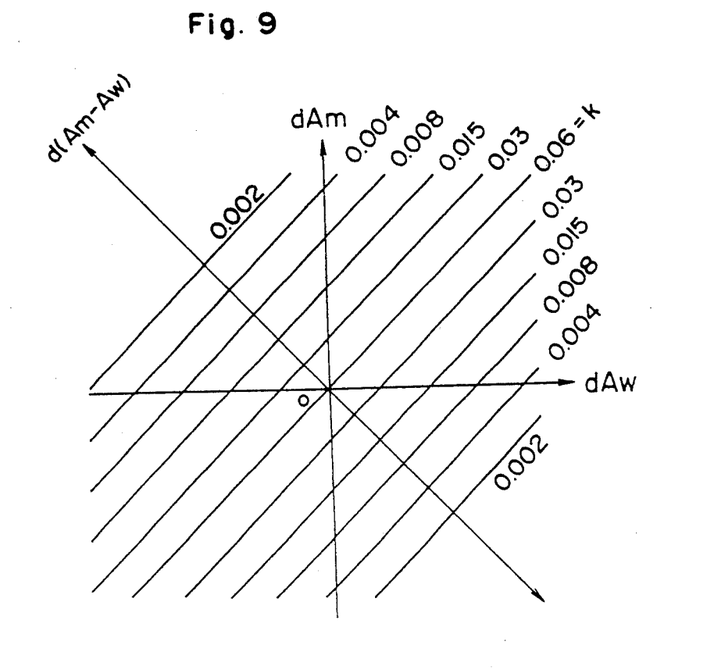
FIG. 9 is a graph showing an alternative map of the adjustment speed k values for zero-point correction.

When it is undesirable to obtain the differentials of Am and Aw independently, the general equation, $$k = f_1(df_2(Am, Aw))$$

can be applied. If $f$ is a linear combination, $$f(dAm, dAw)$$

and $$df(Am, Aw)$$

will be the same. An example of the map obtained from $f_1(d(Am-Aw))$ is shown in FIG. 9. In this case correction of the correction amount is suppressed when travelling in reverse.

The reason the differential is obtained is, because the output Am from the gravity-type accelerometer contains z variable zero point due to the road slope and electrical drift, a small absolute value of the output is not directly connected to the absolute value of the true acceleration being small. It is possible to use the corrected Ac in place of Am when the gravity-type accelerometer is properly corrected, but if the correction has an error the use of the "corrected" value may amplify the error even worse. It is therefore preferable to obtain the differential of Am.

Figure 10:
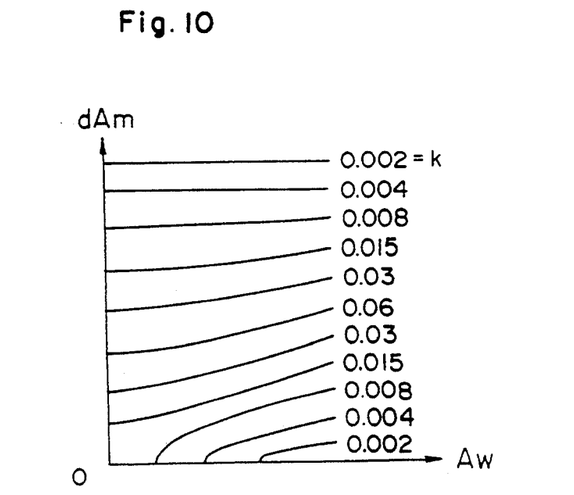
FIG. 10 is a graph showing an alternative map of the adjustment speed k values for zero point correction.

On the other hand, these problems are not found in the estimated vehicle acceleration Aw obtained from the wheel speed, and it is therefore possible to use Aw instead of the differential thereof on one axis of the map. In this case, the physical significance of the 45° lines is eliminated. In Fig. 10 is shown an example of the adjustment speed k of the correction amount when one axis is Aw.

It is to be noted that Aw and dAw can also be used together. Using Aw and dAw is equivalent to making the mapped values of dAw on the horizontal axis variable according to Aw, or the mapped values of Aw on the horizontal axis variable according to dAw. This can be expressed by the general equation $k = f(dAm, dAw, Aw)$.

However, when Aw is used, it is necessary to set the adjustment speed k of the correction amount low, i.e., to slow the adjustment speed when the absolute value of the true acceleration is suggested to be high. It is therefore difficult in this case to correct the sensitivity as will be described below.

Whether non-differentiated or differentiated values, a vibrating behavior can be shown with a variable having a high absolute value. In this case, as the absolute value becomes very small when the value passes zero, an unintentional k may be set. To avoid this, it is possible to treat the variable as having a large absolute value when the amount of change of the variable in one unit operation cycle (equivalent to the differential) is high. For example, it is possible to either take the sum of the absolute value of the variable and the product of a constant multiplied by the absolute value of the amount of change, i.e., the difference between the variable in the previous and current cycles, or to take the greater one of the values.

When setting the actual adjustment speed k of the correction amount, it is important to carefully consider the filter applied to the variables used. This is particularly true when differential operations are performed, because some filtering operations are usually applied to remove excessive noise associating with the differential oprations. Even using a mathematical filter, there may be, not only a simple delay, but also a resonant amplification of noise having a specific frequency.

Summarizing the above, the value of the adjustment speed k of the correction amount is set low when there is apparent excessive tire slipping or spinning, and high when there is no apparent excessive tire slipping or spinning.

It is difficult to avoid slight errors in setting k no matter how much care is taken due to the possible combinations of road slope and vehicle acceleration and deceleration. Therefore, it is preferred to set maximum and minimum limits to the absolute values of the value of dAo obtained by equation (4) to limit the adjustment amount in any single operation cycle to a defined range.

In addition, if the value of the adjustment speed k of the correction amount is set low when the absolute value of Ac and Aw are high, it is possible to prevent the zero-point correction amount from changing too much when sensitivity of the gravity-type accelerometer has an error.

According to the present invention, it is also possible to correct the sensitivity of the gravity-type accelerometer. If s is sensitivity, a and b are the sensitivity correction distribution factors, and Acc is acceleration output by the sensitivity-corrected gravity-type accelerometer, Acc is obtained by the following equation $$Acc = (Am - Ao) * s \qquad (5)$$

where zero point correction amount Ao is $$Ao = Ao + (Acc - Aw) * k * a \qquad (6)$$

and sensitivity s is obtained from the equation $$s = s + (Aw - Acc) * k * b. \qquad (7)$$

The value of b is set high when the absolute value of the acceleration Acc output by the gravity-type accelerometer after correction is high, and is set low when the absolute value of Acc is low. The value of a is set low when the absolute value of Acc is set high, and is high when Acc is low, and may, for example, be defined as $a = 1 - b$. However, a may also be defined as a constant $a = 1$. When sensitivity correction is also applied, it is no longer necessary to change the value of adjustment speed k of the zero-point correction amount by Acc, but as described above it is necessary to use the differentials of both Am and Aw as standards for setting k.

Figure 11:
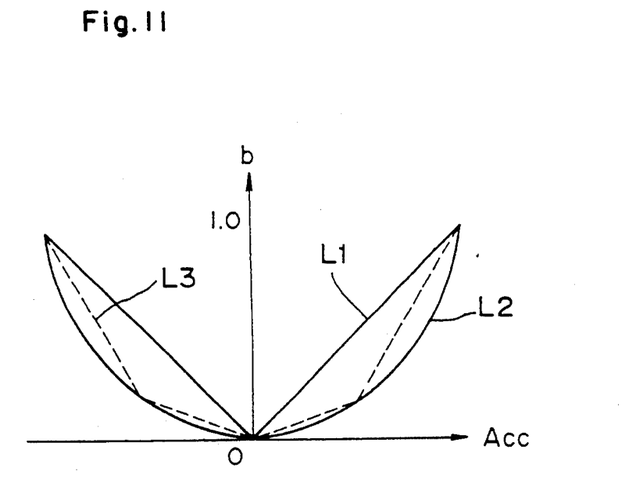
FIG. 11 is a graph illustrating the relationship between the acceleration Acc after correction and the sensitivity correction distribution factor b for sensitivity S.

A method for setting the sensitivity correction distribution factor b is described with reference to FIG. 11, wherein b is the vertical axis and Acc is the horizontal axis. A curve L2 expressed as $b = Acc^2$ is preferred to the linear curve L1 obtained as $b = |Acc|$. When Acc is expressed as a unit of the acceleration of gravity G, the equations shown above are used. However, when Acc is not expressed as a unit of G, it is important to use a proportional constant. Furthermore, the polygonal line L3 shown in FIG. 11 may also be used. This is because it is preferable to apply virtually no sensitivity correction when the absolute value of the acceleration is moderate or less, and to set a high sensitivity correction distribution factor only when the absolute value of the acceleration is extremely high.

In the actual calculation, k*a and k*b can be obtained as the differentials of Am and Aw, respectively, and a function of Acc, eliminating a multiplication step.

Because the output of the gravity-type accelerometer is affected by the slope of the road even when all other factors are correct, zero point correction is required, but accuracy correction is unnecessary if the output of the gravity-type accelerometer is accurate. Furthermore, because it is rare for the absolute value of acceleration to become sufficiently high during normal driving, the need for accuracy correction is dependent upon the sensitivity of the gravity-type accelerometer used, and is only used when the sensitivity is low.

Next is described the application of Feature 2, i.e., Am and Aw are integrated based on the start of excessive tire slipping or spinning, and the difference between these integrations is sufficiently great compared with the elapse of time.

When estimating the vehicle speed from the gravity-type accelerometer, it is common to estimate the vehicle speed based on an acceleration biased by a certain safety factor towards the vehicle acceleration estimated according to the wheel speed because it is dangerous to use the acceleration of the corrected gravity-type accelerometer unmodified. When excessive tire slipping or spinning recede, the two estimated speeds will intersect, and the vehicle speed estimated from the wheel speed again is used.

Therefore, during the period in which the vehicle speed estimated from the gravity-type accelerometer is used as the estimated vehicle speed, the adjustment speed k of the correction amount may be set low. Alternatively, the adjustment speed k of the correction amount may be set low when the difference between the two estimated speeds is greater than a predetermined constant, or the adjustment speed k of the correction amount may be set according to the difference between the two estimated speeds.

However, when Feature 2 is applied, sufficient care is required because a wrong determination once made could thereafter compound the error. The lower limit to the absolute value of the zero-point correction adjustment amount dAo is provided for this reason.

FIRST EMBODIMENT

The preferred embodiment of a zero-point correction device for a gravity-type accelerometer as applied in an antilock brake control device is described hereinbelow.

Figure 1:
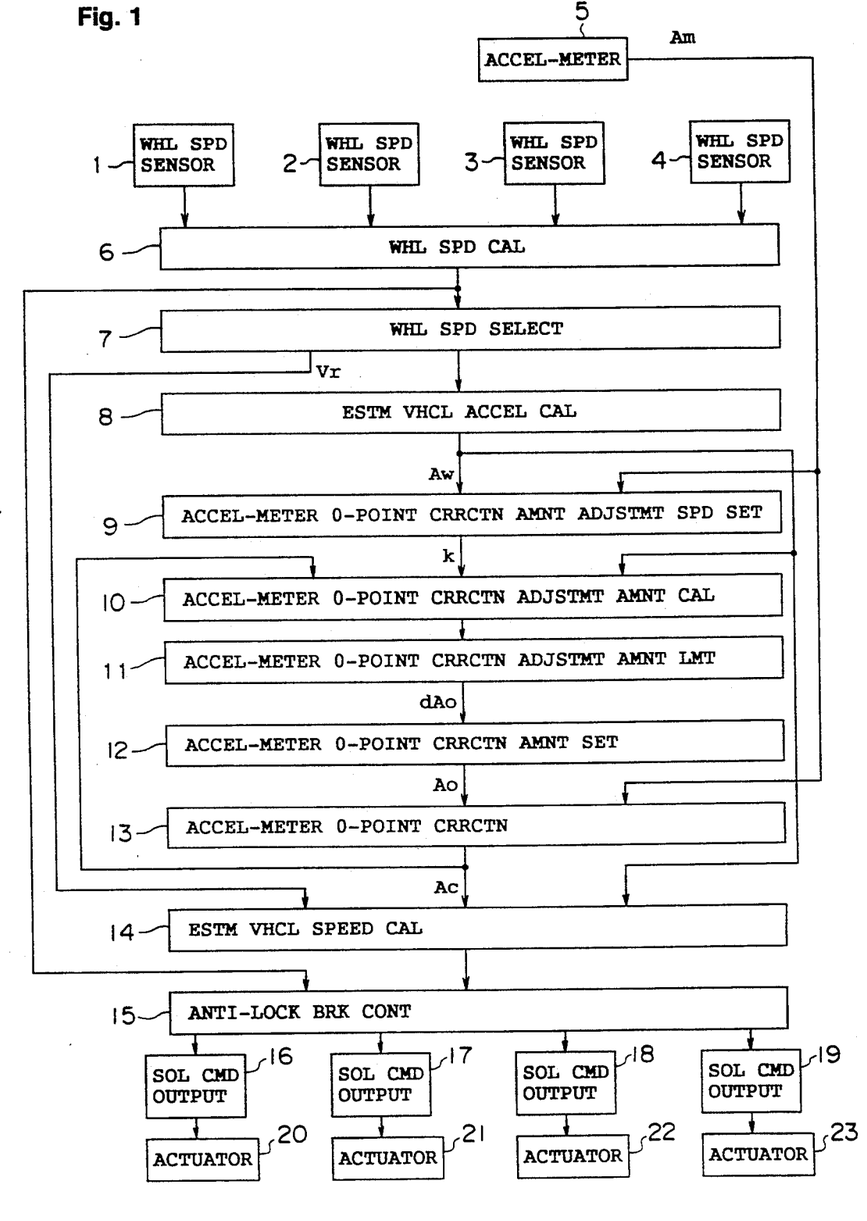
FIG. 1 is a block diagram of an antilock brake control device comprising a zero-point correction device for a gravity-type accelerometer according to the present invention.

FIG. 1 is a block diagram of an antilock brake control device comprising wheel speed sensors 1-4 to detect the rotation of the four wheels, a gravity-type accelerometer 5, a wheel speed calculator 6 to calculate the wheel speed of each of the four wheels based on the signals from the wheel speed sensors, and a wheel speed selector 7 to select the maximum, minimum, or average wheel speed of the four wheels depending upon the conditions. The antilock brake control device further comprises the following elements.

An estimated vehicle acceleration calculating means 8 calculates the estimated vehicle acceleration Aw based on the selected wheel speed.

An accelerometer zero-point correction amount adjustment speed setting means 9 sets the adjustment speed k (delay time) to adjust the correction amount by which zero point of the accelerometer is corrected.

An adjustment amount calculation means 10 calculates the adjustment amount $dAo = (Ac - Aw) * k$ for the adjustment of the accelerometer zero-point correction amount as described with reference to equation 4 above.

An adjustment amount limiter 11 determines whether the adjustment amount dAo is within the allowed range or not, and uses $dAo = (Ac - Aw) * k$ when the adjustment amount dAo is within the range and uses either the maximum or minimum limits for dAo when the value exceeds the allowed range.

An accelerometer zero-point correction amount setting means 12 calculates the zero-point correction amount based on equation (3) above.

An accelerometer zero-point correction means 13 calculates the acceleration Ac according to the gravity-type accelerometer after correction based on equation (2).

An estimated vehicle speed calculation means 14 calculates the estimated vehicle speed based on the selected wheel speed Vr from the wheel speed selector 7 and on either the acceleration Ac obtained from the gravity-type accelerometer after correction or the acceleration Aw estimated from the wheel speed.

An antilock brake controller 15 detects wheel locking symptoms based on the wheel speed and estimated vehicle speed, and outputs an antilock brake control signal.

Solenoid command output means 16-19 each outputs a signal to the solenoid in actuator means 20-23 controlling the brake hydraulic pressure based on the antilock control algorithm.

It is to be noted that the wheel speed from the wheel speed calculator and the corrected acceleration Ac from the accelerometer zero-point correction means 13 are input to the antilock brake controller 15 in addition to the estimated vehicle speed.

The operation of the accelerometer zero-point correction is described next with reference to the flow chart in FIG. 2.

At Step #1 the accelerometer output Am is read, and at Step #2 the wheel speed is calculated based on the outputs from the wheel speed sensors 1-4.

At Step #3 the representative selected wheel speed Vr is selected, and at Step #4 the estimated vehicle acceleration Aw is calculated based thereon.

At Step #5 the differential values dAm and dAw of one acceleration Am output from the gravity-type accelerometer and the estimated vehicle acceleration Aw based on the wheel speed, respectively, are obtained.

At Step #6 the adjustment speed k of the correction amount is produced using the obtained differential values dAm and dAw based, for example on the functions expressed in FIG. 7.

At Step #7 the acceleration Ac obtained from the gravity-type accelerometer after correction is calculated based on equation (2). It is to be noted that the correction amount Ao used in the calculation in Step #7 is the correction value obtained in the previous cycle.

The sequence from Step #8 to Step #17 is the procedure used to calculate the zero-point correction amount Ao used in the next cycle.

At Step #8 the adjustment amount dAo of the correction amount Ao is calculated based on equation (4). At Step #9 it is determined whether the absolute value |dAo| of the correction amount is greater or less than a predetermined lower limit Dmin. If smaller, the procedure advances to Step #10 where it is then determined whether the adjustment amount dAo is negative or positive. If positive, the positive lower limit Dmin is substituted for the adjustment amount dAo (Step #11), and if negative, the negative lower limit −Dmin is substituted for the adjustment amount dAo (Step #12).

If at Step #9 the absolute value |dAo| of the correction amount is greater than the predetermined lower limit Dmin, the procedure advances to Step #13 where it is then determined whether the adjustment amount |dAo| is greater or less than a predetermined upper limit Dmax. If less, no value is substituted for the adjustment amount dAo, which is used, and the procedure advances to Step #17.

However, if at Step #13 the absolute value |dAo| is determined to be greater than Dmax, it is determined at Step #14 whether the adjustment amount dAo is negative or positive. If positive, the positive upper limit Dmax is substituted for the difference dAo (step #15), and if negative, the negative upper limit −Dmax is substituted for the adjustment amount dAo (step #16).

In Step #17, the adjustment amount dAo calculated in Step #8, or the value substituted there for in Step #11, 12, 15, or 16, is subtracted from the correction amount Ao obtained in the previous cycle to adjust the correction amount Ao.

SECOND EMBODIMENT

A second embodiment adding a sensitivity correction means to the gravity-type accelerometer shown in the first embodiment is described hereinbelow with reference to FIGS. 3 and 4.

Figure 3:
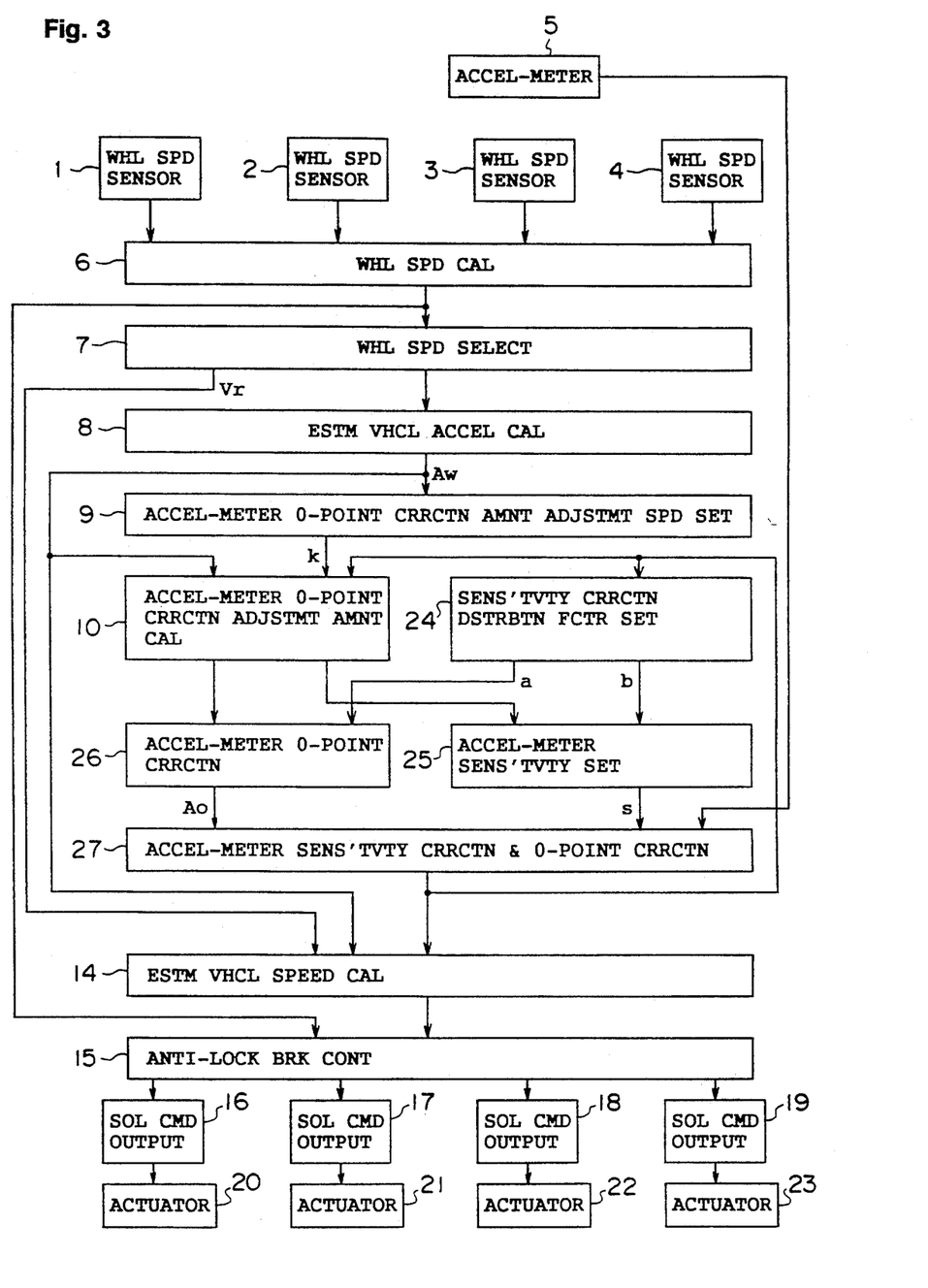
FIG. 3 is a block diagram of an antilock brake control device comprising a zero-point correction device for a gravity-type accelerometer according to another embodiment of the present invention.

The configuration shown in Fig. 3 differs from that shown in FIG. 1 by the addition of a sensitivity correction distribution factor (a,b) setting means 24 and an accelerometer sensitivity setting means 25. Further provided are an accelerometer zero-point correction amount setting means 26 which corresponds to means 12 in FIG. 1, and an accelerometer sensitivity and zero point correction means 27 which corresponds to means 13 in FIG. 1.

Figure 2:
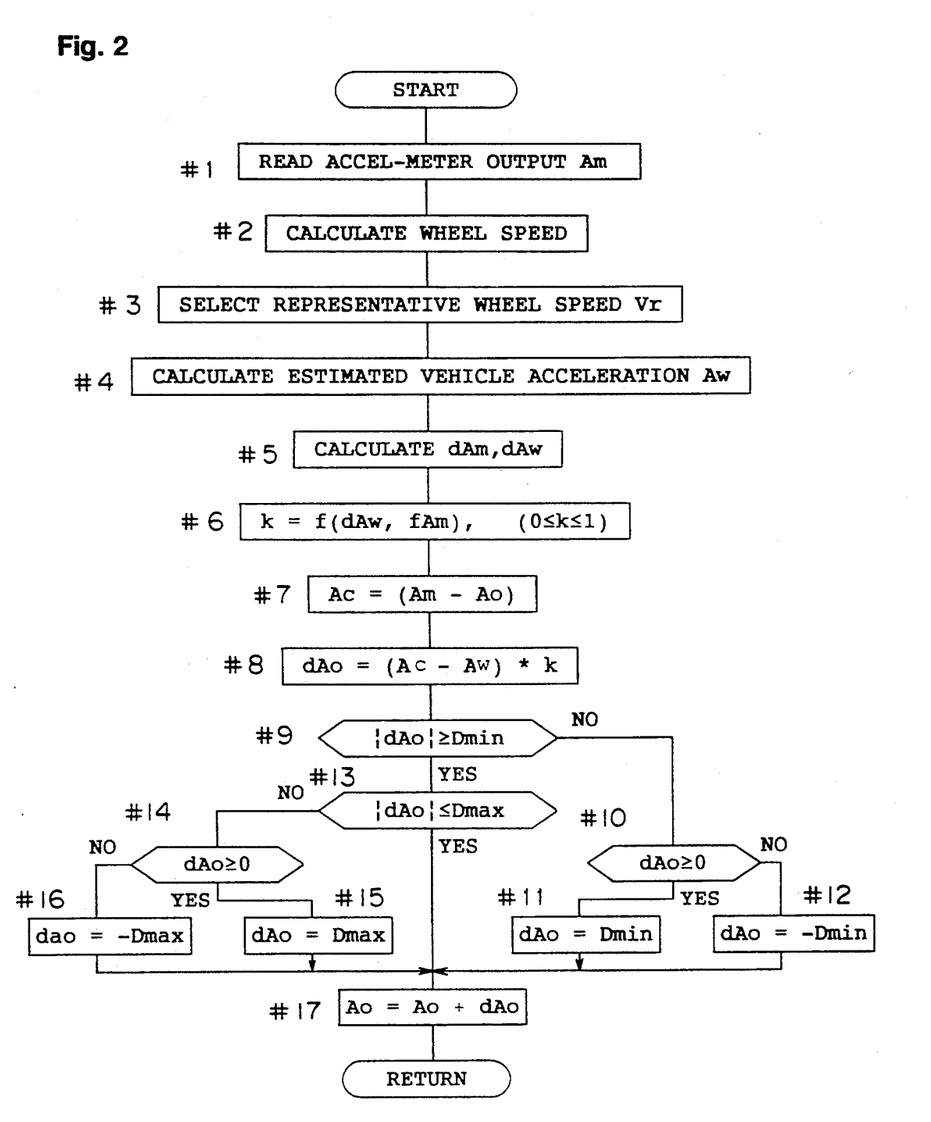
FIG. 2 is a flow chart used to describe the operation of the zero-point correction device in FIG. 1.
Figure 4:
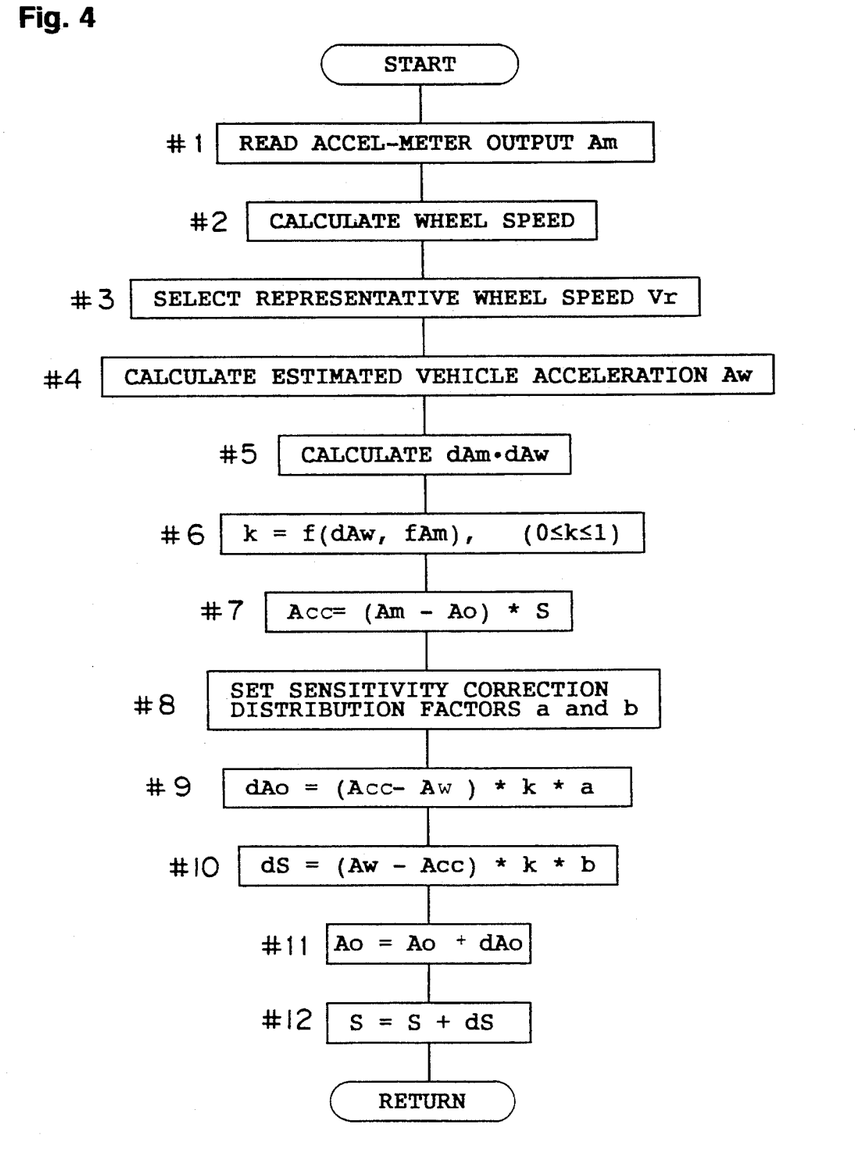
FIG. 4 is a flow chart used to describe the operation of the zero-point correction device in FIG. 3.

Referring to the flow chart in FIG. 4, Steps #7 and 9 differ from the flow chart in FIG. 2, and new Steps #8, 10, and 12 are added.

At Step #7 the acceleration Acc obtained from the gravity-type accelerometer after sensitivity and zero-point correction is calculated from equation (5) using the sensitivity S and the zero point correction amount Ao obtained in the previous cycle.

At Step #8 the sensitivity correction distribution factors a, b are set from the table storing line L2 in FIG. 11, for example, and at Step #9 the adjustment amount dAo for the zero point correction amount Ao is obtained from equation (8), as follows.

$$dAo = (Aw - Acc)*k*a \qquad (8)$$

At Steps #10 and 12, the sensitivity S is calculated using equation (7), and is used at Step #7 in the next cycle to calculate the acceleration Acc.

It is to be noted that the maximum and minimum limits shown in Steps #9 −#15 in FIG. 2 have been eliminated, but the same limits may also be applied to the dAo and ds values.

As thus described, a zero-point correction device for a gravity-type accelerometer according to the present invention can quickly correct the zero point and sensitivity of the gravity-type accelerometer to compensate for the installation precision of the gravity-type accelerometer, electrical drift and gain changes, and other long-term changes, as well as the effects of the slope of the road, thus assuring a high precision output of vehicle acceleration and thereby enabling more accurate vehicle control.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zero-point correction device for a gravity-type accelerometer employed in a vehicle having a plurality of wheels, comprising:
    means for detecting a rotational wheel speed of at least one wheel of said vehicle at each operation cycle; means for calculating an estimated vehicle acceleration Aw from said rotational wheel speed;
    means for measuring a gravitationally detected acceleration Am based on said gravity-type accelerometer;
    means for producing an adjustment speed k which is between 0 and 1 based on said estimated vehicle acceleration Aw and said gravitationally detected acceleration Am;

means for subtracting a correction amount Ao obtained each operation cycle from said gravitationally detected acceleration Am to produce a corrected acceleration Ac which is a corrected version of said gravitationally detected acceleration Am;

means for calculating said correction amount Ao for a present operation cycle by adding to said correction amount Ao obtained for a previous operation cycle, a product of said adjustment speed k multiplied by a difference between said corrected acceleration Ac and said estimated vehicle acceleration Aw, and means for utilizing said calculated correction amount Ao for controlling a wheel behavior control system.

2. A zero-point correction device for a gravity-type accelerometer according to claim 1, wherein said adjustment speed producing means produces said adjustment speed k based on a function of variables comprising at least one of said gravitationally detected acceleration Am, said estimated vehicle acceleration Aw, a differential value dAm of said gravitationally detected acceleration Am, and a differential value dAw of said estimated vehicle acceleration Aw.

3. A zero-point correction device for gravity-type accelerometer according to claim 2, wherein said adjustment speed producing means comprises:

means for differentiating said gravitationally detected acceleration Am to obtain a differential value dAm; an means for producing said adjustment speed k based on said estimated vehicle acceleration Aw and said differential value dAm.

4. A zero-point correction device for a gravity-type accelerometer according to claim 2, wherein said adjustment speed producing means comprises:

means for differentiating said estimated vehicle acceleration Aw and said gravitationally detected acceleration Am to obtain first and second differential values dAw and dAm, respectively; and means for producing said adjustment speed based on said first and second differential values dAw and dAm.

5. A zero-point correction device for a gravity-type accelerometer according to claim 2, wherein said adjustment speed producing means comprises: means for calculating a predetermined function $f_2$ of said estimated vehicle acceleration Aw and said gravitationally detected acceleration Am;

means for differentiating said predetermined function $f_2$ to produce a differentiated function $df_2$; and means for producing said adjustment speed k based on said differentiated function $df_2$.

6. A zero-point correction device for a gravity-type accelerometer according to claim 2, further comprising:

means for calculating an absolute value of at least one of said estimated vehicle acceleration Aw, said gravitationally detected acceleration Am, said differential value dAw of said estimated vehicle acceleration Aw and said differential value dAm of said gravitationally detected acceleration Am.

7. A zero-point correction device for a gravity-type accelerometer according to claim 2, wherein said adjustment speed k produced from said adjustment speed producing means takes a first value when both of said estimated vehicle acceleration Aw and said gravitationally detected acceleration Am vary at substantially the same rate, and takes a second value that is relatively smaller than said first value when said estimated vehicle acceleration Aw varies at a rate that is faster than a rate at which said gravitationally detected acceleration Am varies.

8. A zero-point correction device for a gravity-type accelerometer according to claim 2, wherein said adjustment speed k as produced from said adjustment speed producing means takes a value substantially near 0 when a difference between said estimated vehicle acceleration Aw and said gravitationally detected acceleration Am is greater than a predetermined amount.

9. A zero-point correction device for a gravity-type accelerometer according to claim 1, wherein said means for calculating said correction amount Ao comprises:

means for limiting a value to be added to said correction amount Ao obtained in said previous cycle to be within a predetermined range.

10. A zero-point correction device for a gravity-type accelerometer according to claim 1, wherein said subtracting means comprises:

means for setting a sensitivity S of said gravity-type accelerometer; and means for multiplying said corrected acceleration Ac by said sensitivity S to produces a further corrected acceleration Acc.

11. The zero-point correction device of claim 1, wherein said wheel control behavior control system comprises an antilock brake control system.

12. The zero point correction device of claim 1, wherein said zero point correction device comprises means for determining a speed of a vehicle for controlling said wheel behavior control system.

13. A zero-point correction device for a gravity-type accelerometer used to determine an estimated speed of a vehicle, comprising:

a detector that detects a rotational speed of a wheel of said vehicle;

an acceleration estimation calculator that calculates an estimated vehicle acceleration Aw from said detected rotational speed of said wheel;

said gravity-type accelerometer detecting a gravitational acceleration Am;

a speed adjuster that sets an adjustment speed k based on said estimated vehicle acceleration Aw and said gravitationally detected acceleration Am;

a subtractor that subtracts a correction amount Ao obtained in each operation cycle from said detected gravitational acceleration Am to produce a corrected acceleration Ac which represents a corrected version of said detected gravitational acceleration Am;

a calculator that calculates said correction amount Ao for a present operation cycle by adding to said correction amount Ao obtained in a previous operation cycle, a product of said adjustment speed k multiplied by a difference between said corrected acceleration Ac and said estimated vehicle acceleration Aw; and a wheel control system that controls an operating condition of said wheel in accordance with said calculated correction amount Ao.

14. The zero-point correction device of claim 13, wherein said wheel control system comprises an antilock brake control system.

15. The zero-point correction device of claim 13, wherein said subtractor includes a sensitivity adjustment that modifies said corrected acceleration Ac to produce a further corrected acceleration Acc.

16. The zero-point correction device of claim 13, wherein said adjustment speed producing means comprises:
   a differentiator that differentiates said gravitationally detected acceleration Am to obtain a differential value dAm; and
   means for producing said adjustment speed k based on said estimated vehicle acceleration Aw and said differential value dAm.

17. The zero-point correction device of claim 13, wherein said adjustment speed producing means comprises:
   means for calculating a predetermined function $f_2$ of said estimated vehicle acceleration Aw and said gravitationally detected acceleration Am;
   means for differentiating said predetermined function $f_2$ to produce a differentiated function $df_2$; and
   means for producing said adjustment speed k based on said differentiated function $df_2$.

18. The zero-point correction device of claim 13, wherein said vehicle has a plurality of wheels, said detector comprising a plurality of detectors, in which one detector is associate with one wheel of said plurality of wheels, and a wheel speed calculator calculates said rotational speed of each wheel, and further comprising a wheel speed selector that selects a maximum wheel speed, a minimum wheel speed or an average wheel speed based upon predetermined conditions.

19. A zero-point correction device for a gravity-type accelerometer, comprising:
   a detector that determines an estimated acceleration, of a rotating object;
   said gravity-type accelerometer detecting a gravitational acceleration Am;
   a rotational speed adjuster that sets an adjustment speed in response to said estimated acceleration and said detected gravitational acceleration;
   means for producing a corrected acceleration based upon a corrected version of said detected gravitational acceleration;
   a calculator that calculates a correction amount by multiplying said adjustment speed by a difference between said corrected acceleration and said estimated acceleration; and
   a control system that controls an operating condition of said rotating object in accordance with said calculated correction amount.

20. The zero-point correction device of claim 19, wherein said rotating object comprises a wheel of a vehicle, and said control system comprises an antilock brake system.

21. The zero-point correction device of claim 19, wherein said rotational speed adjuster sets said adjustment speed between 0 and 1 based upon said estimated acceleration and said detected gravitational acceleration.

* * * * *